United States Patent [19]

Gardner et al.

[11] 4,228,115
[45] Oct. 14, 1980

[54] METHOD OF MAKING A HORN PAD

[75] Inventors: Lawrence B. Gardner, Vandalia; Philip W. Hopf, Centerville, both of Ohio

[73] Assignee: General Motors Corporation, Detroit, Mich.

[21] Appl. No.: 23,026

[22] Filed: Mar. 22, 1979

[51] Int. Cl.² .............................................. B79D 27/04
[52] U.S. Cl. ................................ 264/46.4; 174/52 PE; 200/61.55; 200/159 B; 264/230; 264/45.5; 264/272
[58] Field of Search ................... 264/46.4, 46.5, 46.6, 264/272, 230, DIG. 83, 45.5; 200/159 B, 61.55; 174/52 PE

[56] References Cited

U.S. PATENT DOCUMENTS

| | | | |
|---|---|---|---|
| 2,944,170 | 7/1960 | Knapp et al. | 264/46.5 X |
| 3,040,385 | 6/1962 | Folta | 264/272 X |
| 3,093,448 | 6/1963 | Kirkpatrick et al. | 264/272 |
| 3,313,017 | 4/1967 | Zingali . | |
| 3,417,176 | 12/1968 | Anderson et al. | 264/272 X |
| 3,579,821 | 5/1971 | Kurisu | 264/46.5 X |
| 3,619,525 | 11/1971 | Sjoberg . | |
| 3,685,006 | 8/1972 | Jerrold-Jones | 264/272 X |
| 3,718,791 | 2/1973 | Szablowski . | |
| 3,722,086 | 3/1973 | Wikkerink et al. . | |
| 3,800,396 | 4/1974 | Puchner . | |
| 3,909,504 | 9/1975 | Browne | 264/272 X |
| 3,954,537 | 5/1976 | Alfter et al. | 264/DIG. 83 |
| 3,961,002 | 6/1976 | Brown | 264/DIG. 83 |
| 4,033,030 | 7/1977 | Robinson et al. . | |

Primary Examiner—Philip Anderson
Attorney, Agent, or Firm—F. J. Fodale

[57] ABSTRACT

A horn pad assembly having a large irregularly shaped horn switch subassembly is made by enclosing the horn switch subassembly in a sealed bag of heat shrinkable plastic film to mask the slots and holes in the subassembly, heat shrinking the heat shrinkable plastic film to provide a relatively smooth and taut enclosure, and molding a decorative pad of resilient plastic material onto the portions of the heat shrunk plastic film covering the top sides and underside edges of the horn switch subassembly.

4 Claims, 8 Drawing Figures

METHOD OF MAKING A HORN PAD

This invention relates generally to horn pads for automobile steering wheels and more particularly to a method of making decorative horn pads for contemporary automobile steering wheel designs.

Decorative horn pads are presently manufactured by fabricating a horn switch subassembly which is attachable to the hub and spokes of the automobile steering wheel. A decorative cover or pad is separately molded and then assembled to the horn switch subassembly to provide the decorative horn pad which is responsive to finger pressure to operate the horn switch and energize the automobile horn.

The object of this invention is to provide an improved method for manufacturing decorative horn pads.

Another object of this invention is to provide an improved method for manufacturing decorative horn pads having large, irregularly shaped horn switch subassemblies.

Another object of this invention is to provide a method for manufacturing large decorative horn pads which eliminates the need for separately molding and assembling a decorative cover or pad.

Another object of this invention is to provide a method for manufacturing a decorative horn pad wherein a decorative cover or pad is molded over a horn switch subassembly without adversely affecting the functionality of the horn switch subassembly.

Other objects and features of the invention will become apparent to those skilled in the art as the disclosure is made in the following detailed description of a preferred embodiment of the invention as illustrated in the accompanying sheets of drawing in which.

Figure 1:
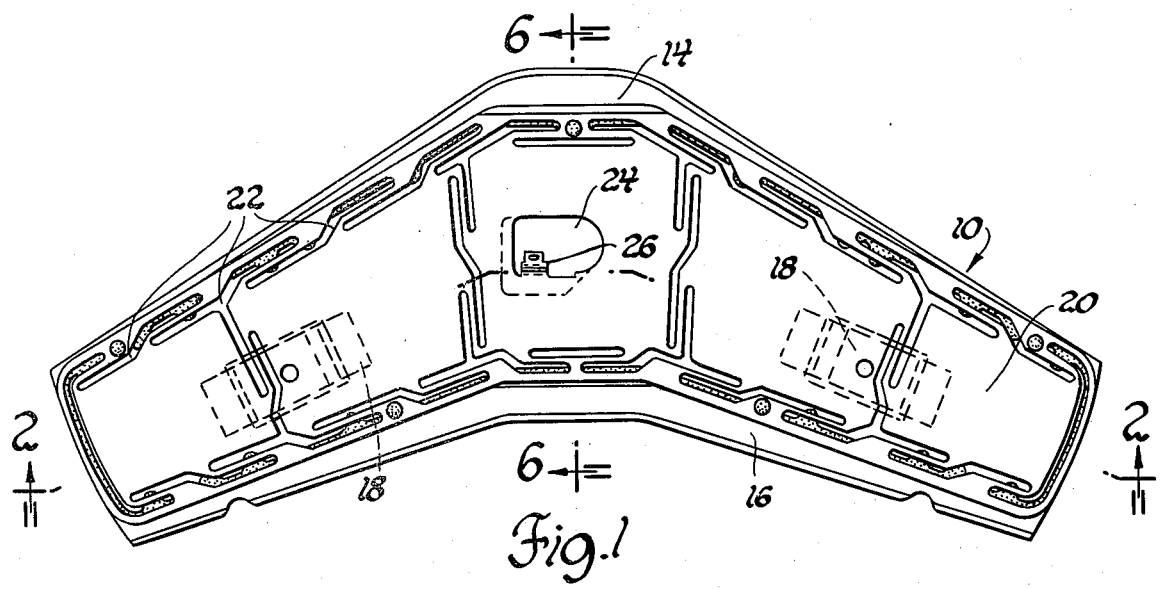
FIG. 1 is a plan view of a typical horn switch subassembly which may be utilized in a method in accordance with this invention.
Figure 2:
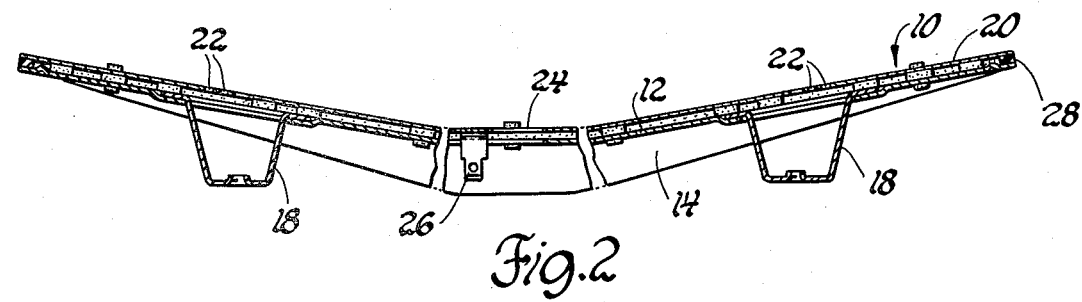
FIG. 2 is a vertical section of the subassembly shown in FIG. 1 taken substantially along the line 2—2 of FIG. 1 looking in the direction of the arrows.
Figure 6:
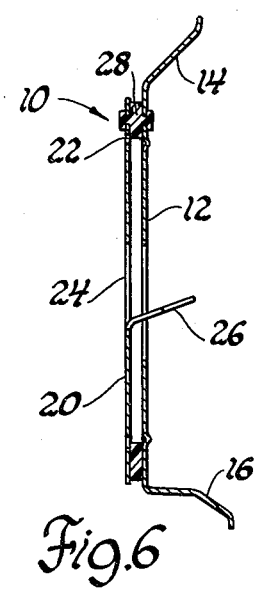
FIG. 6 is a vertical section of the horn switch subassembly shown in FIGS. 1 and 2 taken substantially along the line 6—6 of FIG. 1 looking in the direction of the arrows.

Referring now to the drawing, FIGS. 1, 2 and 6 show a horn switch subassembly 10 typical of those presently used to manufacture decorative horn pads for automobile steering wheels. Such subassemblies are typically about 14 inches long to fit over the hub and spokes of the steering wheel and are generally irregularly shaped for mounting to the steering wheel structure and fitting into its overall design.

The horn switch subassembly 10 is generally wing shaped in planform and comprises a correspondingly shaped support plate 12 stamped from sheet metal. The support plate 12 is slightly dished and has front and rear vertical skirts 14 and 16 which are deep at the center of the support plate 12 and then taper into its side edges. The skirts 14 and 16 stiffen the support plate 12 and are shaped to fit the hub and spoke structure of the contemporary automobile steering wheels which are typically deeply dished. The support plate 12 carries two mounting brackets 18 which are welded to its upper surface and extend below the skirts 14 and 16 via punched holes. The brackets 18 have threaded holes for bolting the horn pad to the steering wheel spokes.

The horn switch subassembly further comprises a flat wing shaped switch plate 20 which generally matches the planform of the support plate 12. The switch plate 20 typically has a pattern of slots 22 around its periphery and across several locations so that the switch plate 20 is quite flexible. The switch plate 20 also has a central cut-out 24 which provides an integral electrical terminal 26 which is bent downwardly and extends into a protected space between the skirts 14 and 16 via a central cut-out in the support plate 12.

The horn switch subassembly 10 further comprises a plastic insulation gasket 28 between the outer edge portions of the support plate 12 and the switch plate 20 to insulate and space the two plates from each other. The gasket 28 has a number of integral projections which extend through mating holes in the support and switch plates 12 and 20 and are headed to secure the three parts together. While the gasket 28 spaces and insulates the switch plate 20 from the support plate 12 the pattern of slots 22 renders the switch plate 12 sufficiently flexible so that the flat switch plate 20 conforms to the vertical dish of the support plate 12 and so that virtually any portion of the assembled switch plate 20 can be flexed into electrical contact with the support plate 12 responsive to finger pressure and will return to a spaced position when the finger pressure is removed.

The known prior art horn switch subassembly 10 shown in FIGS. 1, 2 and 6 is made into a decorative horn pad in the following manner.

Figure 3:
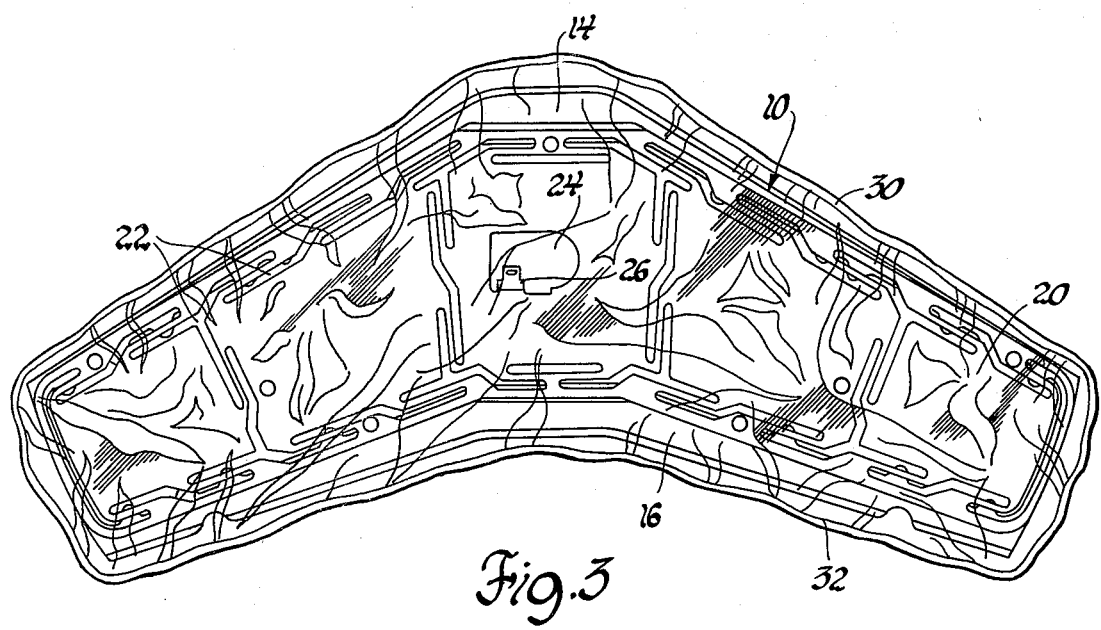
FIG. 3 is a plan view of the horn switch subassembly of FIG. 1 in the process of being made into a decorative horn pad in accordance with this invention.

First the horn switch subassembly 10 is enclosed in a bag 30 of heat shrinkable, heat sealable plastic film such as the polyethylene shrink film produced by RJR Filmco of Aurora, Ohio under the trade name 75 BIS P. This may be accomplished by wrapping a sheet of the film around the irregularly shaped subassembly 10 and heat sealing the sheets together around the periphery of the subassembly 10 as indicated at 32 in FIG. 3. It is important that the bag or enclosure 30 for the horn switch subassembly 10 be completely sealed and it is desirable that the bag 30 conform to horn switch subassembly 10 as much as possible. The bag 30, however, will have a wrinkled appearance due to the irregular shape of the horn switch subassembly 10 as shown in FIG. 3.

Figure 4:
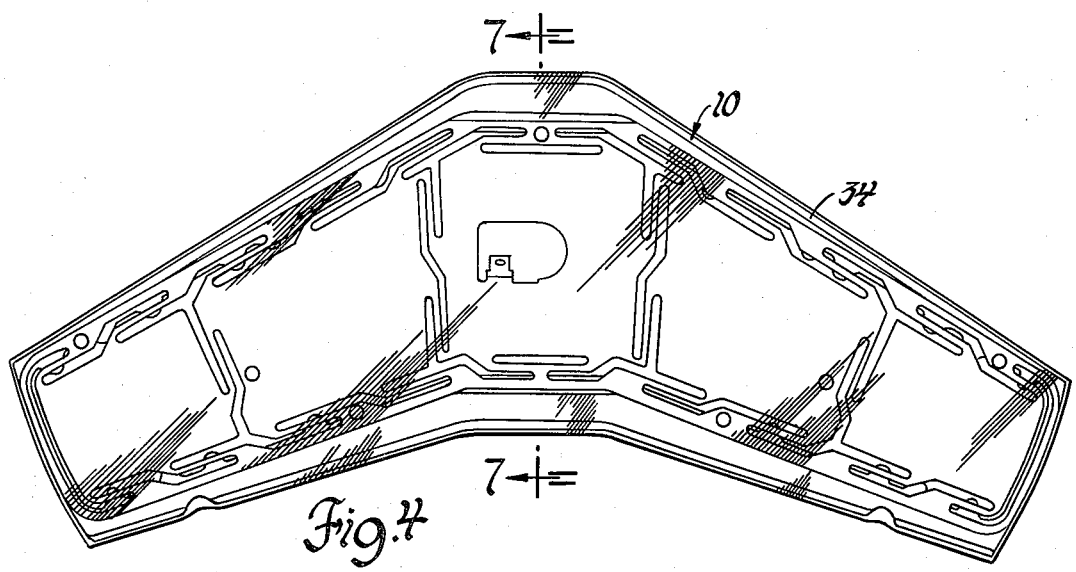
FIG. 4 is a plan view of the horn switch subassembly further along in the process of being made into a decorative horn pad in accordance with this invention.
Figure 7:
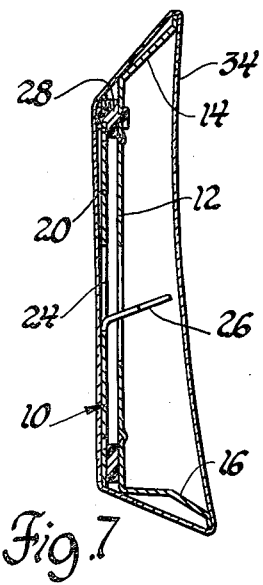
FIG. 7 is a vertical section of the partially made decorative horn pad taken substantially along the line 7—7 of FIG. 4 looking in the direction of the arrows.

The bagged or enclosed horn switch subassembly 10 is then heated sufficiently (to about 208° F.) to shrink the plastic film to produce a relatively smooth and taut enclosure 34 while maintaining the integrity of the plastic film as shown in FIGS. 4 and 7.

The horn switch subassembly 10 encapsulated in the heat shrunk enclosure 34 is then placed in a mold (not shown) and a decorative pad 36 is molded onto a portion of the heat shrink plastic film. The material of the pad must be compatible with the heat shrink film so that the film stays intact to mask the pattern of slots 22 and other openings in the horn switch subassembly 10 during the molding process so that the horn switch subassembly retains its functionality. The material for the pad 36 is preferably a urethane polymer which forms an integral outer skin 38 in the mold. These materials are generally the reaction products of diisocyanates and polyols. The physical properties of the urethane material, such as resiliency, can be adjusted depending upon the aesthetic qualities desired. At this time a soft feel is considered desirable and consequently a soft or resilient foamed urethane polymer is preferred. Materials with the above stated physical properties are well known in the molding art. The pad can also be molded from a poly(vinyl chloride) plastisol. While the use of these two polymeric pad materials has been specifically disclosed, other polymers with similar physical properties would be equally suited for this invention.

Figure 5:
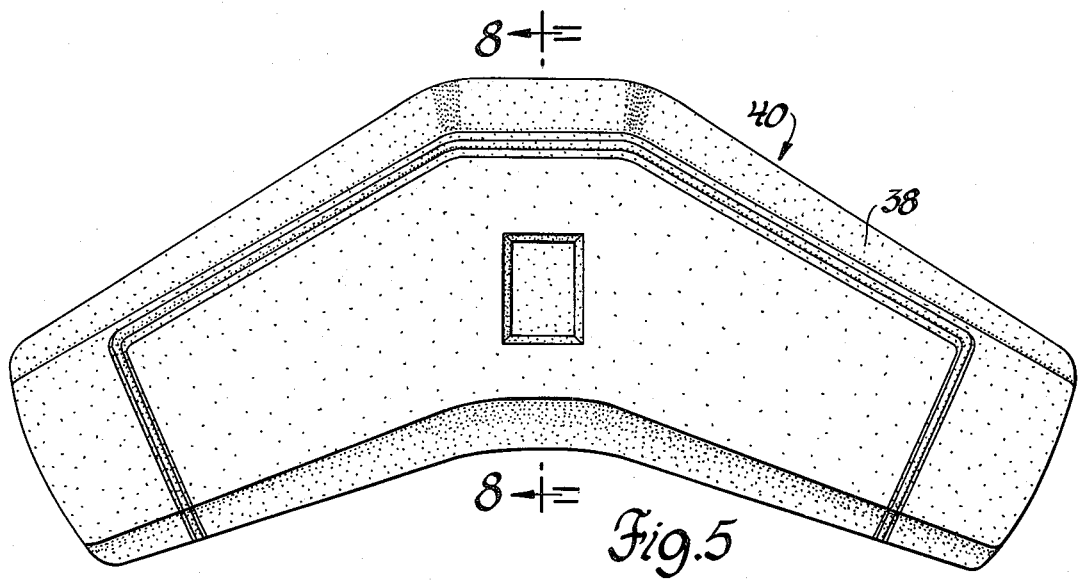
FIG. 5 is a plan view of a decorative horn pad made in accordance with this invention.
Figure 8:
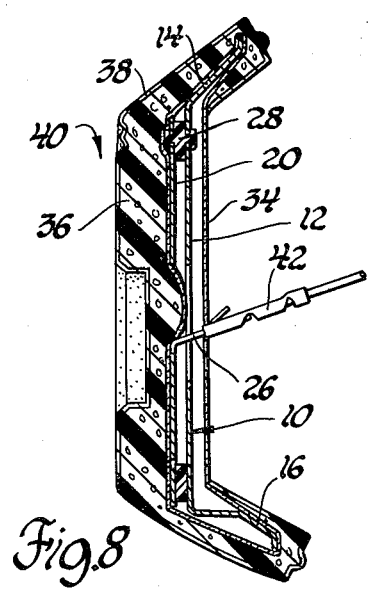
FIG. 8 is a vertical section of the completed decorative horn pad taken substantially along the line 8—8 of FIG. 5 looking in the direction of the arrows.

FIGS. 5 and 8 show the completed horn pad 40 with the pad 36 molded in place. The pad 36 completely covers the top and sides of the horn switch subassembly 10 for a pleasing appearance and also wraps around the underside of the support plate 12 for retention. The plastic film accommodates additional stretching during the molding process which permits a tighter wrap of the molded pad 36 around the skirts 14 and 16 at the underside of the support plate 12. The molded pad 36 also adheres to the plastic film to supplement retention. The underside central portion of the plastic film is left exposed. The exposed plastic film is easily pierced so that a feed terminal 42 can be connected to the integral terminal 26 and the completed horn pad assembly 40 can be attached to a steering wheel with relative ease.

We wish it to be undrstood that we do not desire to be limited to the exact details of construction shown and described, for obvious modifications will occur to a person skilled in the art.

The embodiments of the invention in which an exclusive property or privilege is claimed are defined as follows:

1. A method of manufacturing a horn pad assembly which includes a horn switch subassembly having an electrically conductive support plate adapted for mounting on a steering wheel and an electrically conductive switch plate which is spaced and insulated from the support plate by an insulation gasket and which has a pattern of slots rendering the switch plate sufficiently flexible to engage the support plate responsive to finger pressure, comprising the steps of:
    enclosing the horn switch subassembly in a sealed bag of heat shrinkable plastic film to mask the pattern of slots in the switch plate,
    heat shrinking the heat shrinkable plastic film to provide a relatively smooth and taut enclosure, and
    molding a decorative pad of resilient polymeric material onto the portions of the heat shrunk plastic film covering the switch plate and the sides and underside edges of the support plate.

2. A method of manufacturing a horn pad assembly which includes a large, irregularly shaped horn switch subassembly having an electrically conductive support plate adapted for mounting on a steering wheel and an electrically conductive switch plate which is spaced and insulated from the support plate by an insulation gasket and which has a pattern of slots rendering the switch plate sufficiently flexible to engage the support plate responsive to finger pressure, comprising the steps of:
    enclosing the horn switch subassembly in a sealed bag of heat shrinkable plastic film to mask the pattern of slots in the switch plate,
    heat shrinking the heat shrinkable plastic film to provide a relatively smooth and taut enclosure, and
    molding a decorative pad of foamable self-skinning urethane onto the portions of the heat shrunk plastic film covering the switch plate and the sides and underside edges of the support plate.

3. A method of manufacturing a horn pad assembly which includes a horn switch subassembly having an electrically conductive support plate having vertical skirts adapted for mounting on a steering wheel and an electrically conductive switch plate which is spaced and insulated from an upper surface of the support plate by an insulation gasket and which has a pattern of slots rendering the switch plate sufficiently flexible to engage the support plate responsive to finger pressure, comprising the steps of:
    enclosing the horn switch subassembly in a sealed bag of heat shrinkable plastic film to mask the pattern of slots in the switch plate,
    heat shrinking the heat shrinkable plastic film to provide a relatively smooth and taut enclosure, and
    molding a decorative pad of resilient polymeric material onto the portions of the heat shrunk plastic film covering the switch plate and the sides and underside edges of the support plate,
    said plastic film spanning the vertical skirts stretching during molding to permit the molded pad to wrap around the underside edges of the skirts for mechanically retaining the molded pad on the switch assembly.

4. A method of manufacturing a horn pad assembly which includes a horn switch subassembly having an electrically conductive support plate having vertical skirts and protruding brackets at its underside for mounting on a steering wheel and an electrically conductive switch plate which is spaced and insulated from an upper surface of the support plate by an insulation gasket and which has a pattern of slots rendering the switch plate sufficiently flexible to engage the support plate responsive to finger pressure, and which has an integral terminal protruding through a central hole in the support plate into a protected area between the skirts, comprising the steps of:
    enclosing the horn switch subassembly in a sealed bag of heat shrinkable plastic film to mask the pattern of slots in the switch plate and the central hole in the support plate;
    heat shrinking the heat shrinkable plastic film to provide a relatively smooth and taut enclosure, and
    molding a decorative pad of resilient polymeric material onto the portions of the heat shrunk plastic film covering the switch plate and the sides and underside edges of the support plate,
    said plastic film being exposed at the central underside portion of the completed horn pad assembly to provide access to the brackets and integral terminal.

* * * * *